United States Patent
Stephens et al.

(10) Patent No.: US 12,004,563 B2
(45) Date of Patent: Jun. 11, 2024

(54) ASSEMBLY FACILITATING THE GENERATION OF VAPOR

(71) Applicants: Tanya M. Stephens, Miami, FL (US); Marco A. Plyler, Miami, FL (US)

(72) Inventors: Tanya M. Stephens, Miami, FL (US); Marco A. Plyler, Miami, FL (US)

(*) Notice: Subject to any disclaimer, the term of this patent is extended or adjusted under 35 U.S.C. 154(b) by 374 days.

(21) Appl. No.: 17/410,768

(22) Filed: Aug. 24, 2021

(65) Prior Publication Data

US 2022/0039468 A1 Feb. 10, 2022

Related U.S. Application Data

(63) Continuation-in-part of application No. 16/186,963, filed on Nov. 12, 2018, which is a continuation-in-part of application No. 16/186,001, filed on Nov. 9, 2018, now abandoned.

(51) Int. Cl.
*A24F 40/42* (2020.01)
*A24F 40/30* (2020.01)

(52) U.S. Cl.
CPC ............. *A24F 40/42* (2020.01); *A24F 40/30* (2020.01)

(58) Field of Classification Search
CPC .................................. A24F 40/42; A24F 40/30
USPC ......................................................... 131/329
See application file for complete search history.

(56) References Cited

U.S. PATENT DOCUMENTS

| | | |
|---|---|---|
| D543,259 S | 5/2007 | Chueh et al. |
| D722,721 S | 2/2015 | Ross |
| D731,634 S | 6/2015 | Page et al. |
| D752,281 S | 3/2016 | Alima |
| D776,868 S | 1/2017 | Rado |
| D790,767 S | 6/2017 | Rush et al. |
| 9,775,382 B2 | 10/2017 | Wang |
| D817,732 S | 5/2018 | Rettler |
| D844,236 S | 3/2019 | Tidnam et al. |
| D854,739 S | 7/2019 | Li |
| D872,357 S | 1/2020 | Hoch et al. |
| D944,594 S | 3/2022 | Sumner |
| D979,836 S | 2/2023 | Yan |
| 11,612,702 B2* | 3/2023 | Bowen ................ B32B 15/09 131/274 |
| 11,647,783 B2* | 5/2023 | Bowen ................ G06F 3/147 131/273 |

(Continued)

OTHER PUBLICATIONS

3DHOYYTT, Battery Connector for DIY BOX www.amazon.com/Profile-Spring-Battery-Connector-Mechanical/dp/B09ZGWVS1C/ref=sr_1_49?keywords=510+Thread+Magnetic+Adapter&qid=1679451845&sr=, May 4, 2022.

*Primary Examiner* — Gary F Paumen
(74) *Attorney, Agent, or Firm* — Malloy & Malloy, PL; Peter A. Matos

(57) ABSTRACT

An assembly facilitating the generation of vapor including a power source and a power adapter electrically connected to said power source and including a plurality of connectors. The power adapter includes a plurality of conductors disposed and structured to independently direct current flow from the power source to each of said plurality of connectors. Each of the connectors includes a conductive terminal electrically connected to the power adapter. Each of the plurality of connectors is structured for removable, electrically conductive connection, via corresponding ones of the terminals and conductors, to a different one of a plurality of vaporizable material cartridges.

20 Claims, 14 Drawing Sheets

(56) References Cited

U.S. PATENT DOCUMENTS

| | | | |
|---|---|---|---|
| 11,660,403 B2* | 5/2023 | Atkins | A61M 11/042 |
| | | | 131/271 |
| 11,700,888 B2* | 7/2023 | Force | A24F 40/48 |
| | | | 131/329 |
| 11,707,092 B2* | 7/2023 | Plattner | A24F 40/46 |
| | | | 131/329 |
| D1,003,504 S | 10/2023 | Stephens et al. | |
| 2014/0332016 A1* | 11/2014 | Bellinger | A61M 16/161 |
| | | | 131/328 |
| 2014/0366898 A1* | 12/2014 | Monsees | A24F 40/30 |
| | | | 131/329 |
| 2015/0053217 A1* | 2/2015 | Steingraber | A24F 40/50 |
| | | | 131/329 |
| 2015/0150305 A1* | 6/2015 | Shenkal | A24F 40/485 |
| | | | 131/329 |
| 2015/0150308 A1* | 6/2015 | Monsees | A24F 7/00 |
| | | | 131/329 |
| 2015/0181937 A1* | 7/2015 | Dubief | A61M 15/06 |
| | | | 131/329 |
| 2015/0208729 A1* | 7/2015 | Monsees | A24F 40/53 |
| | | | 131/329 |
| 2015/0342259 A1* | 12/2015 | Baker | A24F 40/485 |
| | | | 131/329 |
| 2016/0120229 A1* | 5/2016 | Tucker | A24F 40/70 |
| | | | 131/329 |
| 2020/0146358 A1 | 5/2020 | Stephens et al. | |
| 2020/0297033 A1* | 9/2020 | Wang | H02J 7/0063 |
| 2021/0227842 A1 | 7/2021 | Middleton | |
| 2022/0039468 A1 | 2/2022 | Stephens et al. | |
| 2022/0235301 A1 | 7/2022 | Oliver | |

* cited by examiner

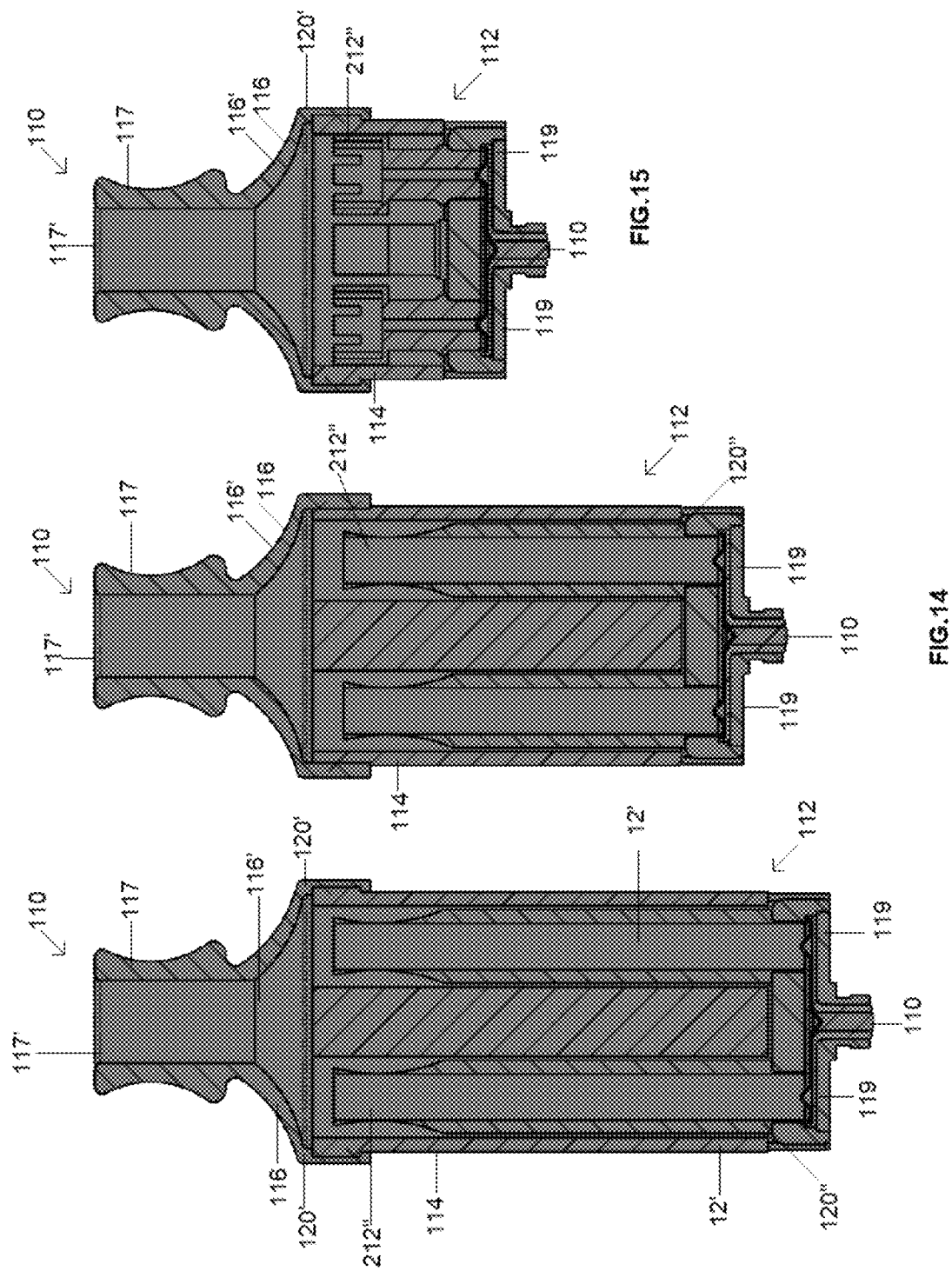

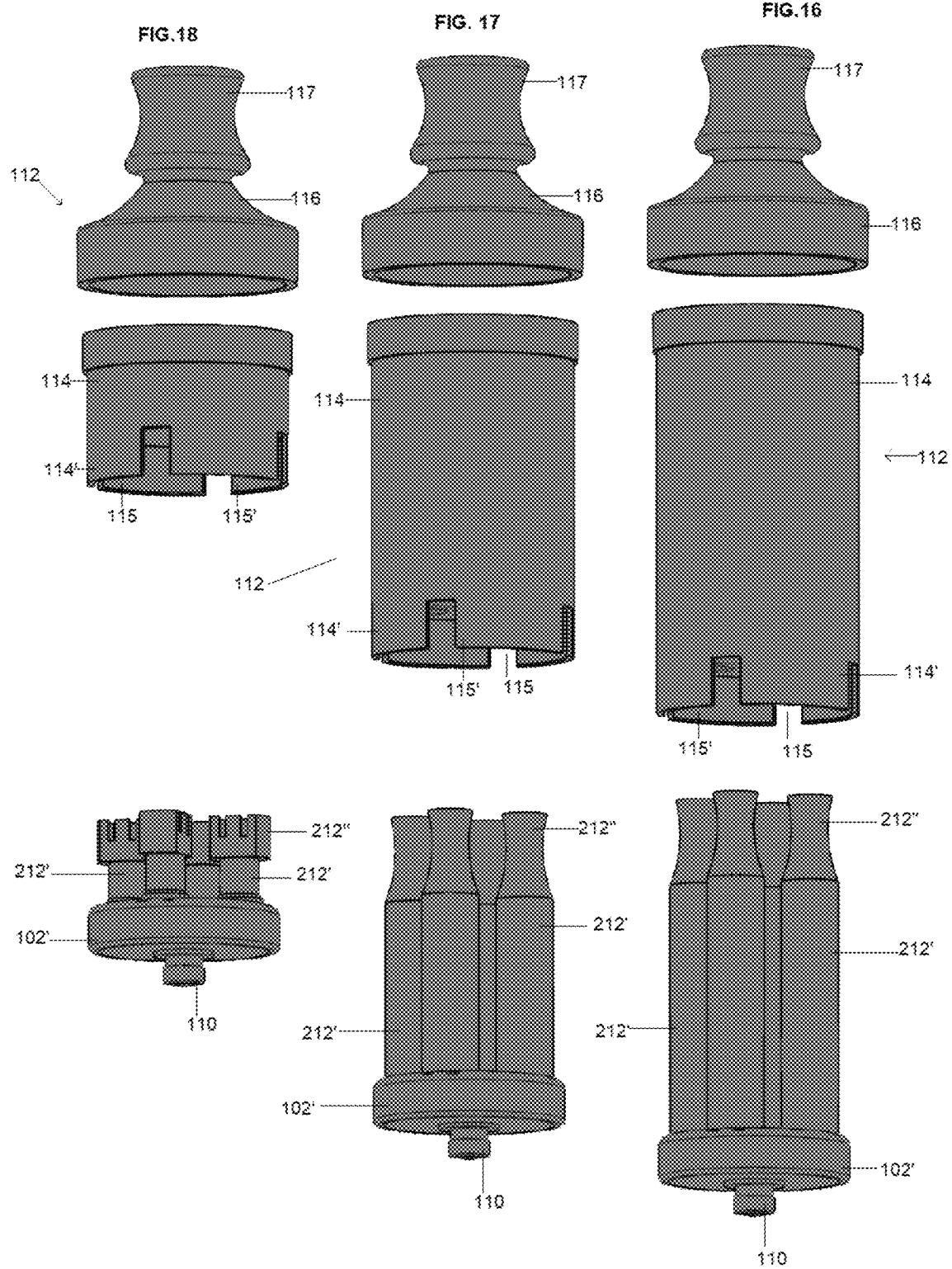

ASSEMBLY FACILITATING THE GENERATION OF VAPOR

CLAIM OF PRIORITY

The present application is a continuation-in-part application of previously filed, application having Ser. No. 16/186,963, filed on Nov. 12, 2018, which has issued as U.S. Pat. No. 11,916,202, and which is a continuation-in-part application of previously filed, now abandoned application having Ser. No. 16/186,001, filed on Nov. 9, 2018, both of which are incorporated herein by reference in their entireties.

BACKGROUND OF THE INVENTION

Field of the Invention

The present invention is directed to an assembly which facilitates the generation of vapor, specifically including consumable vapor, of the type generated by E-cigarettes, personal vaporizers, etc. As such, the one or more embodiments of the present invention include structural and operative versatility which enables their use with different brands, categories, structures etc. of vaporizable material cartridges, of the type associated with different commercially available vaporizers.

Description of the Related Art

Electronic cigarettes or personal vaporizers have become increasingly popular with the consuming public as an alternative to or substitute for the smoking of conventional, tobacco-based cigarettes. As used, "vaping" devices are operative to vaporize an "E-liquid", vaping substance or vaporizable material to produce a consumable vapor, mist, etc. Such a generated vapor is then inhaled by a user of the personal vaporizer and is intended to serve as a satisfying replacement for the experience of smoking a cigarette.

As a result, and due to the recognized dangers of cigarette smoking, vaporizing devices of this type have become increasingly popular. Further, E-cigarettes, personal vaporizers and like devices overcome many of the universally recognizable disadvantages of conventional cigarettes including, but not limited to, the absence of tar, odor, ash, pollution, and the inhalation of irritating and carcinogenic byproducts typically resulting from the burning of tobacco in the conventional cigarette. However, there are still numerous disadvantages associated with the use of known or commercially available personal vaporizers, which prevent or restrict their use, in terms of aiding an individual in his/her efforts to quit smoking.

E-cigarettes, personal vaporizers, etc. are typically battery-powered devices which simulate tobacco smoking by producing a consumable vapor, which is generated by the powering of a heating element or atomizer, which in-turn vaporizes the E-liquid solution or vaping substance. In addition, such E-liquids may contain nicotine, in varying degrees, as well as flavoring agents and other ingredients.

It is recognized that to increase the popularity of such vaporizing devices it is necessary to provide the users with a positive experience, which corresponds to or substantially parallels the experience involved in conventional smoking. This means, at least in part, that personal vaporizers must provide the user with a consistent and desirable volume of vapor, which in turn may be related to the consistency and reliability of the battery power sources associated with such devices. In more specific terms, when the power or charge provided by the battery is depleted, voltage in the battery naturally decreases, which in turn derogatorily effects the volume of vapor generated. As a result, known or conventional vaporizers, E-cigarettes, etc. are considered to be unreliable, based at least in part on their inconsistencies and failure to provide the desired or intended "smoking experience".

In order to overcome disadvantages and problems of the type set forth above, there have been numerous attempts to increase and or selectively regulate the volume of vapor generated in order to more closely correspond to the conventional tobacco smoking process. Such known or prior art attempts have been directed to the inclusion of variable power sources which may be selectively and/or automatically regulated dependent on the usage of the personal vaporizer. In addition, attempts have been made to increase the generated volume of vapor of such E-cigarettes, personal vaporizers, etc. by increasing the quantity vaporizable material and or the delivery characteristics thereof. Such attempts may also involve the modified structuring of the cartridges which contain the vaporizable material as well as a heating element operative to heat and vaporize the aforementioned E-solution.

In spite of the above attempts and known structural and operative features of conventional and commercially available personal vaporizers, there still remains distinct and recognizable disadvantages which hinder the use thereof.

Accordingly, there is a need in this area for a proposed and preferred assembly which facilitates the generation of consumable vapor by concurrently energizing a selective or predetermined plurality of vaporizable material cartridges in order to increase the quantity of the generated vapor. In addition, operative features associated with such a preferred and proposed assembly enables selective variance of the content, flavor and quantity of the vapor generated by each of a plurality of vaporizable material cartridges. In addition, the preferred embodiments of such an assembly are structured to have an enhanced versatility allowing it to be used in combination with a number of different brands, types, categories, etc. of vaporizable material cartridges.

SUMMARY OF THE INVENTION

The present invention is directed to an assembly which facilitates the generation of consumable vapor, when used in combination with a plurality of vaporizable material cartridges. As used herein, the term "vaporizable material cartridge" is meant to describe any one of a plurality of different type cartridges used with E-cigarettes, personal vaporizers, etc. which contain a vaporizable material such as, but not limited to, those set forth herein and commercially available.

In more specific terms, conventional and/or commercially available vaporizable material cartridges typically include a single mouthpiece disposed in fluid communication with a supply of vaporizable material. Further such conventional or commercially available cartridges include at least one heating element or operational equivalent structure that generate sufficient heat, when electrically activated, to vaporize the material within the cartridge. Accordingly, vapor is generated, passed through the mouthpiece of the cartridge and is consumed by a user of the E-cigarette, vaporizer, etc. As indicated hereinafter, each of the preferred embodiments of the assembly of the present invention is structured to be used with different ones of a plurality of vaporizable material cartridges regardless of the brand, capacity, type, category, etc.

Therefore, one preferred embodiment of the present invention is directed to an assembly facilitating the generation of consumable vapor, when used in combination with any one or preferably a plurality of vaporizable material cartridges. As such, the assembly of this embodiment includes a housing including a power source and a plurality of connectors. Each of the plurality of connectors is structured to direct or transfer electrical current to each of the vaporizable material cartridges connected to different ones of the plurality of connectors.

In addition, each of the plurality of connectors comprises a conductive terminal disposable in current transferring relation to a heating element within a correspondingly disposed one of the plurality of vaporizable material cartridges to which a corresponding connector is attached. Moreover, in this preferred embodiment, the power source comprises a plurality of batteries each electrically connected to a different one of the plurality of connectors and to a corresponding one of the terminals associated with each of the plurality of connectors.

The housing of this embodiment comprises a plurality of housing sections each of which is dimensioned and configured to contain a different one of the plurality of batteries which define the power source. In cooperation therewith, each of the plurality of connectors is disposed in segregated relation to one another while being concurrently attached to a different one of the plurality of housing sections. Also, in at least one structural modification, each of the plurality of housing sections comprises a tubular or sleeve-like configuration having a hollow interior. The hollow interior of each of the plurality of tubular or sleeve-like housing sections is dimensioned to retain a different one of the plurality of batteries therein in segregated relation to one another. Moreover, each the batteries may be rechargeable batteries.

One feature of this embodiment comprises the plurality of housing sections being fixedly connected one another to collectively define a "unitary construction" of the housing. The unitary construction of the housing may be further defined by the fixedly attached housing sections and the corresponding plurality of connectors thereby facilitating the handling and utilization. In addition, the unitary construction of the housing may be concurrently attached to a plurality of vaporizable material cartridges, thereby providing an increase in the volume of vapor output.

Another feature of this embodiment of the present invention includes the aforementioned control assembly being operatively connected to the power source. Further, the control assembly comprises a plurality of switches each operatively mounted on a different one of the housing sections in current regulating relation between correspondingly disposed ones of said plurality of batteries and the connector/terminals. Moreover, each of the plurality of switches is structured to variably regulate current flow from the plurality of batteries to correspondingly disposed ones of the plurality of terminals. Further, each of the plurality of switches of the control assembly is structured for independent activation and control of each of the terminals.

Therefore, due at least in part to the enhanced versatility of the control assembly, comprising a plurality of switches, each of the terminals may be independently activated, which in turn activates a corresponding one of the vaporizable material cartridges attached to the connector associated with a given terminal. As should also be apparent, the plurality of switches may be concurrently activated and independently regulated such that all of the plurality of vaporizable material cartridges attached to the individual connectors/terminals concurrently produce vapor. Such concurrent activation serves to greatly increase the volume of generated vapor accessible by a user.

As is well known, the composition of the available vaporizable material in different cartridges may include different flavoring agents, quantities of nicotine and other ingredients. Therefore, the plurality of switches of the control assembly may independently and/or concurrently activate the plurality of connected vaporizable material cartridges, in order to selectively vary the content of the vapor being consumed. In addition, the current directed to each of the cartridges may be variably regulated to control the amount of vapor generated by each of the cartridges. Accordingly, while the volume of generated vapor may be greatly increased to the satisfaction of a user, such a user can also selectively regulate the different flavors, agents, etc. contained within the generated vapor by selectively varying the amount of current transferred to each cartridge, via a corresponding terminal/connector to which a given cartridge is attached.

To further facilitate the delivery of vapor generated concurrently by a plurality of vaporizable material cartridges, the assembly of the present invention is also usable with and may include a vapor access or inhalation adaptor. The access or inhalation adaptor may be structurally adapted for use with different preferred embodiments of the present invention and includes an access opening or "mouthpiece". Further, the access or inhalation adaptor may be removably connected to the housing in at least partially enclosing relation to all of the vaporizable material cartridges and in direct fluid communication with the quantity of vapor generated thereby. In accomplishing this, the access or inhalation adaptor may include a path of fluid flow disposed and structured to direct vapor concurrently generated by all of the vaporizable material cartridges. Such collective vapor is then directed along the aforementioned path of fluid flow to the access opening or mouthpiece of the access or inhalation adaptor.

Yet another preferred embodiment of the present invention is directed to an assembly which also facilitates the generation of vapor when used in combination with preferably a plurality of vaporizable material cartridges. As such, this preferred embodiment has similar operational advantages, which may be attractive to the user or consumer, at least to the extent of enhancing the volume of generated vapor and the ability to concurrently consume vapor generated by a plurality of vaporizable material cartridges.

More specifically, this additional preferred embodiment includes a current or power adapter electrically connected to a power source. The power source may be a part of the assembly as provided to the consuming public. In the alternative, the power adapter may be utilized with different power sources and be made available to the consuming public independently of the power source.

Therefore, the power adapter includes a plurality of connectors each of which is structured for operative attachment to a different one of a plurality of vaporizable material cartridges. In addition, a power adapter includes a current distributor comprising a plurality of conductors. Each of the plurality of conductors is electrically interconnected between the power source and a different one of the plurality of connectors. The power adapter also includes a conductive attachment structured to be removably connected to the power source. As such, the plurality of conductors are disposed and structured to independently direct current flow from the conductive attachment, connected to the power source, and each of the plurality of connectors.

As with the preferred embodiment described above, this additional preferred embodiment includes each of the connectors having a terminal, wherein each terminal is electrically connected in current transferring relation to a heating element within an attached one of the plurality of vaporizable material cartridges. The plurality of terminals and corresponding ones of the plurality of connectors are cooperatively structured to assure electrical interconnection between each terminal and a heating element associated with the vaporizable material cartridge attached to a corresponding one of the connectors, as also set forth above.

In even more specific terms, the power adapter comprises a base, wherein each of the plurality of connectors are fixedly mounted on an exposed, outer face or end of the base so as to extend outwardly there from in laterally spaced relation to one another. The lateral spacing of the plurality of connectors are such as to facilitate the concurrent attachment of a plurality of the vaporizable material cartridges thereto, thereby enabling their concurrent use. In cooperation therewith, the aforementioned conductive attachment is fixedly mounted on and extends outwardly from an inner and/or opposite face of the base, relative to the plurality of connectors. As such the conductive attachment is structured to be removably connected and thereby establish an electrical interconnection between the power source and the plurality of connectors.

Further, one additional feature of this embodiment of the assembly includes the power source being a single battery a of sufficient capacity to concurrently and/or individually power each of the plurality of vaporizable material cartridges connected to different ones of the plurality of connectors. Adaptive switching may be operatively associated with the battery, such as being mounted on a casing or housing disposed in retaining relation to a single battery power source. The output terminal of the battery is directly but removably electrically interconnected to the conductive attachment associated with the base of the power adapter. Therefore, the removable attachment of the power adapter, via the conductive attachment, establishes an operative electrical interconnection between the battery, the conductors of the current distributor and the terminals associated with each of the plurality of connectors. In turn, the heating elements of each of the plurality of vaporizable material cartridges, connected to different ones of the plurality of connectors/terminals, are capable of being individually and collectively activated. The resultant activation, through appropriate switching, will serve to selectively activate the plurality of vaporizable material cartridges attached to the plurality of connectors, resulting in a concurrent generation of vapor from the plurality of cartridges.

As with the embodiments described above, this embodiment may also be utilized with a power source and power adapter. More specifically, this embodiment of the access or inhalation adaptor may be removably connected to the power adapter in at least partially enclosing relation to all of the vaporizable material cartridges and in direct fluid communication with the quantity of vapor generated thereby. In accomplishing this, the access or inhalation adaptor may include a path of fluid flow disposed and structured to direct vapor concurrently generated by all of the vaporizable material cartridges to a mouthpiece of the access or inhalation adaptor.

The present invention further comprises one or more additional preferred embodiments directed to an assembly including an access or inhalation adapter of the type operationally similar but structurally distinguishable from the access or inhalation adapter of the type set forth above. More specifically, the access or inhalation adapter of this additional one or more embodiments includes a housing having a base segment and an access segment. The base segment is structured to concurrently receive the plurality of cartridges, containing a vaporizable material, in an operative, vapor generating position on the interior thereof. In cooperation therewith, the access segment is connected to the base segment in fluid communication to the outlets of the plurality of cartridges. In addition, the access segment may include or at least partially define a mouthpiece dimensioned and configured to direct vapor concurrently, from the plurality of cartridges within the base segment to the user's mouth, thereby facilitating inhalation or consumption by the user.

In order to facilitate utilization of the inhalation adapter, the base segment and the access segment of the housing may be removably connected to one another in order to aid in the insertion and/or removal of the plurality of cartridges, after and before use. As also explained in greater detail hereinafter, the inhalation or access adapter is structurally and operatively intended to be used with the aforementioned power adapter and attended power source, thereby completing the intended operative features of generating and inhaling vapor concurrently from a plurality of vaporizable material cartridges.

The housing and more particularly the base segment comprises a plurality of interior substantially elongated chambers each dimensioned to receive and maintain a different one of the plurality of cartridges therein in an operative, vapor generating position, when operatively attached to the power adapter and power source. Moreover, the plurality of chambers are disposed in laterally spaced, at least partially segregated relation to one another as they extend, in substantially parallel relation to one another along at least a majority and/or an entirety of the length of the base segment and/or housing. Further, each of the plurality of chambers includes opposite open ends, where in one open end adjacent the access segment is disposed in fluid communication with the mouthpiece, including at least one vapor outlet. The open end opposite the access segment of each of the plurality of cartridges is disposed, dimensioned and configured to engage or align with correspondingly disposed ones of the plurality of connectors of the power adapter, in a manner which facilitates electrical powering of the heat element commonly associated with each of the plurality of cartridges. Accordingly, the aforementioned operative, vapor generating position of each of the plurality of cartridges comprises the access or inhalation adapter operatively connected to the power source via the power adapter, as set forth in greater detail hereinafter.

Therefore, this embodiment of the present invention, including the inhalation adapter having a plurality of chambers for receiving the plurality of cartridges, may be assembled by attachment of the base segment of the housing to the power adapter. Concurrently the power adapter is secured to the power source such that it serves to electrically interconnect each of the plurality of cartridges within the plurality of chambers of the base segment of the housing to the power source.

In order to further facilitate operative assembly and disassembly including the insertion and removal of the plurality of cartridges, the base segment may be removably connected to the power adapter in a manner which assures the electrical interconnection of the plurality of cartridges to the power source, as set forth above. As such, the base segment includes a flexible portion disposable in removable outwardly expanded, gripping attachment with the access segment and in substantially surrounding relation to the outer periphery thereof. The structural features of the flexible portion may include a flexible end portion structured to define somewhat of a "snap-fit" attachment. Such a snap-fit connection or attachment allows the connection to and removal of the base segment to the power adapter by a pushing and pulling force respectively exerted the base segment and/or the power adapter.

Also, the versatility of the structural and operative features of this embodiment of the present invention allows assembly of the inhalation adapter to the power source by attaching the plurality of cartridges to the power adapter and subsequently attaching the power adapter to the power source. In the alternative, the power adapter may be operatively secured to the power source and the plurality of cartridges subsequently connected to the power adapter. In each of these assembly modes, the plurality of cartridges, once attached to the power adapter, are inserted into individual ones of the plurality of chambers within the base segment of the housing. Moreover, if the access segment is removably connected to the base segment it may then be secured thereto such that the correspondent disposed open opposite ends are in fluid communication with the access segment and the vapor outlet of the preferably integrated mouthpiece. Obviously, if the access segment and base segment are fixedly attached or integrated, the access segment will be disposed in a fully assembled orientation concurrently with the base segment being attached to the power adapter, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIGS. 13, 14 and 15 are longitudinal sectional views in assembled form of different sizes of yet another preferred embodiment of the present invention, including an access or inhalation adapter.

FIGS. 16, 17 and 18 are each an exploded view respectively, of the embodiments of FIGS. 13, 14 and 15 in partially assembled form.

Like reference numerals refer to like parts throughout the several views of the drawings.

DETAILED DESCRIPTION OF THE PREFERRED EMBODIMENT

Figure 1:
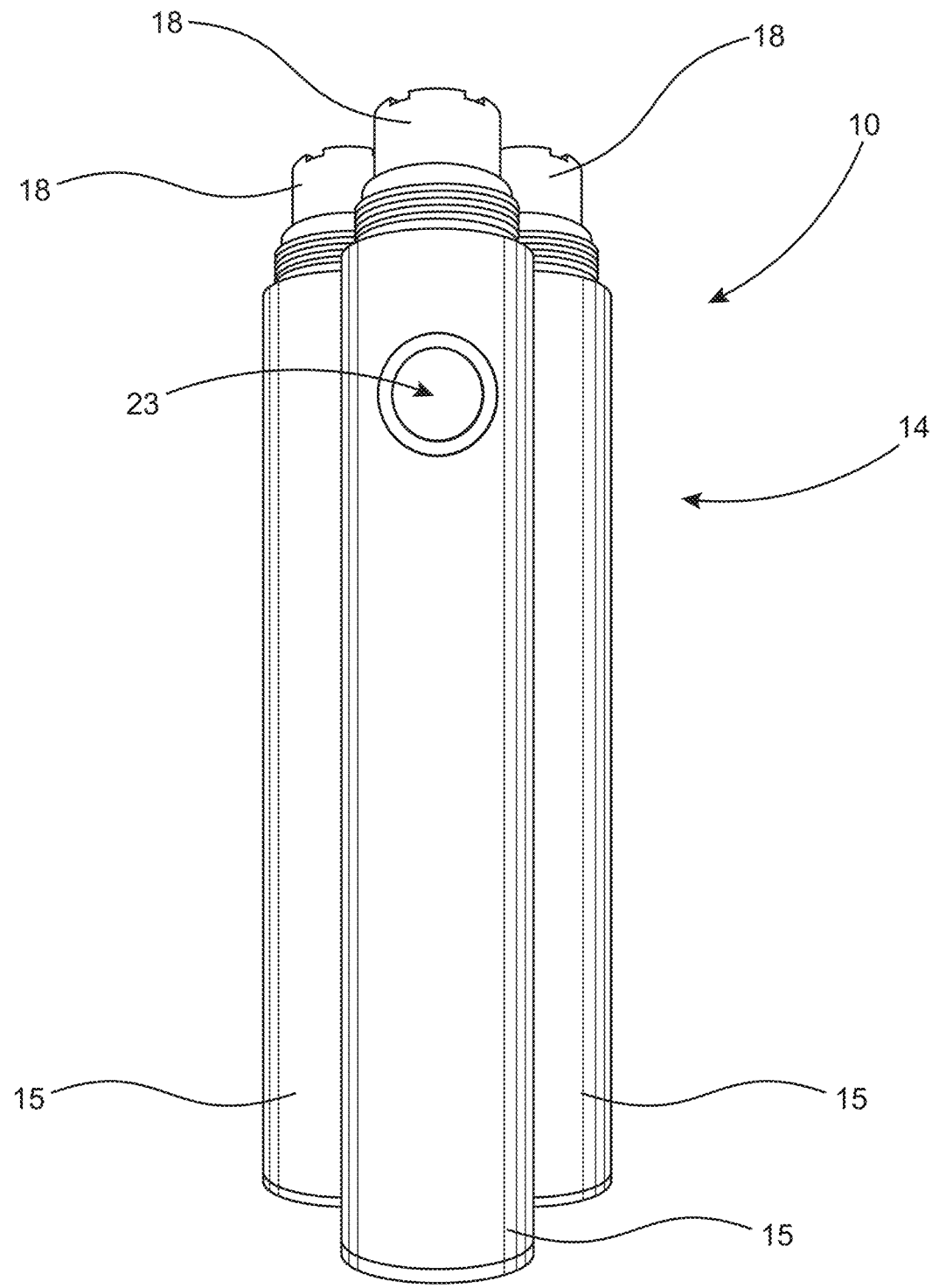
FIG. 1 is a perspective view of one embodiment of a vapor generating assembly of the present invention.
Figure 2:
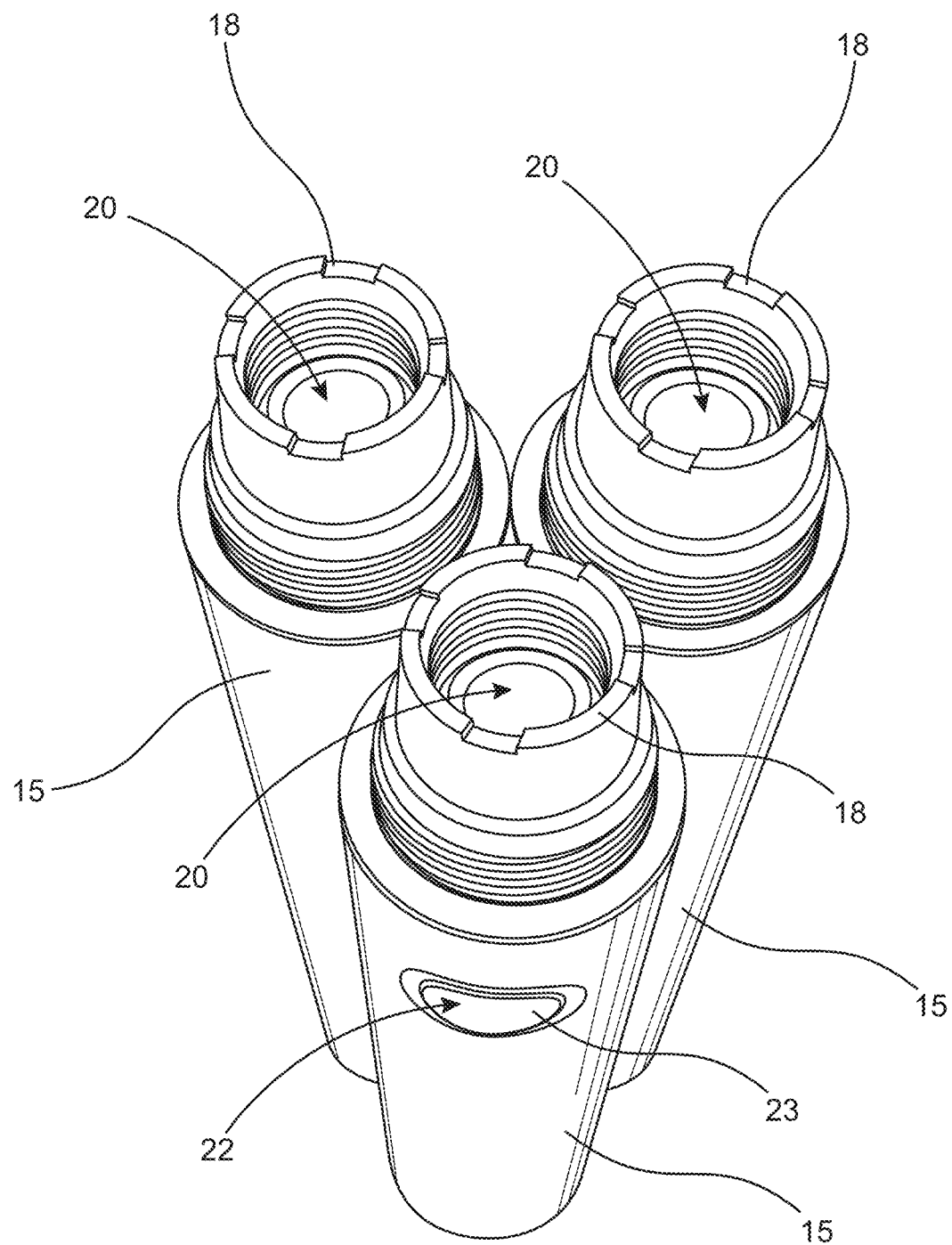
FIG. 2 is a top perspective view of the embodiment of FIG. 1.
Figure 3:
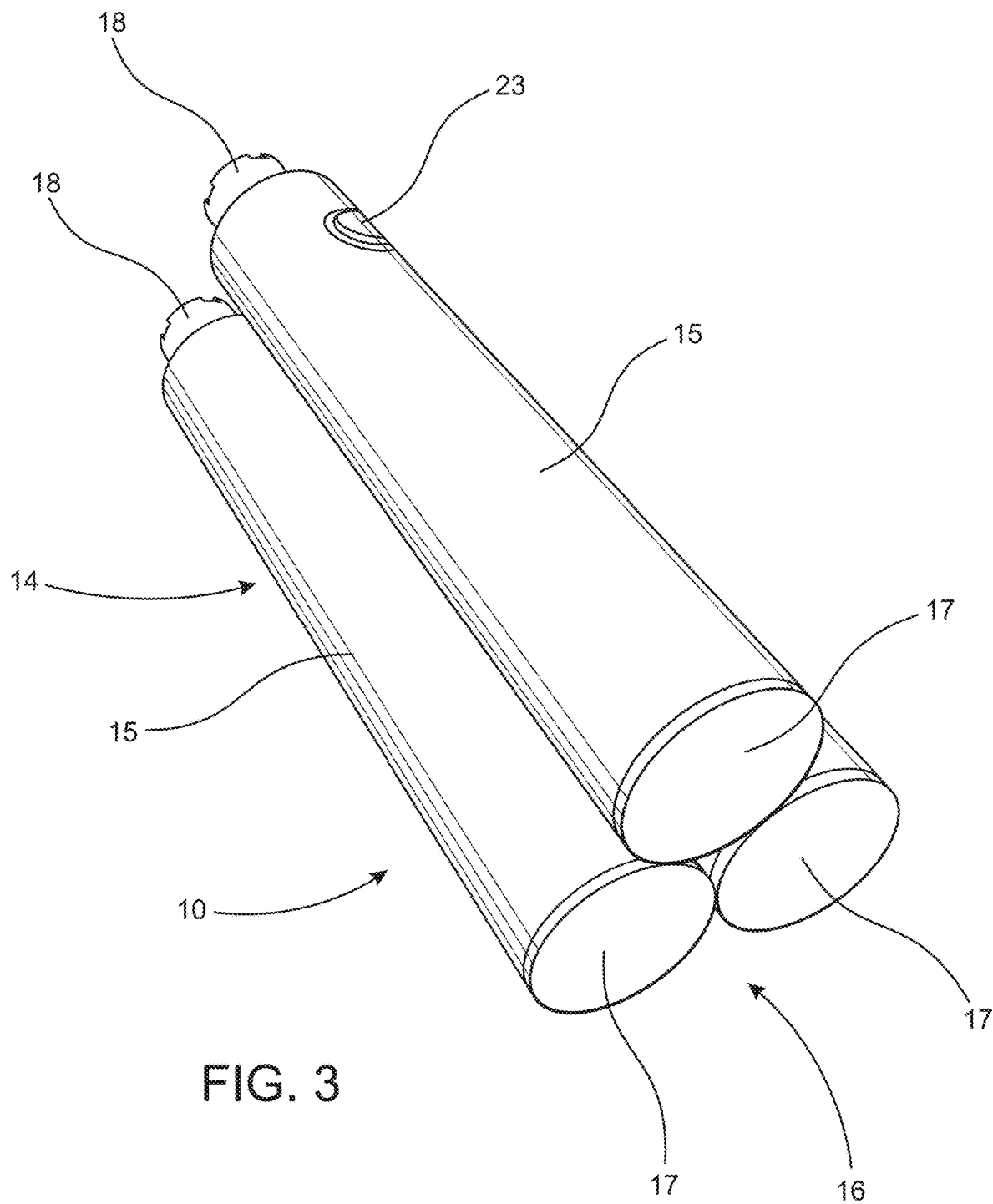
FIG. 3 is a bottom perspective view of the embodiment of FIGS. 1-2.

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is directed to an assembly, having a plurality of embodiments, which facilitate the generation of consumable vapor, when used in combination with a plurality of vaporizable material cartridges. With primary reference to FIGS. 1-6, one preferred embodiment of the present invention is directed to an assembly generally indicated as 10 facilitating the generation of consumable vapor, when used in combination with any one or preferably a plurality of vaporizable material cartridges 12 of the type represented in, but not limited to, FIG. 5. As such, the assembly 10 of this embodiment includes a housing generally indicated as 14, including a power source 16 and a plurality of connectors 18. Each of the plurality of connectors 18 includes a terminal 20 structured to direct or transfer electrical current to each of a plurality of vaporizable material cartridges 12 connected to a corresponding one of the plurality of connectors 18.

Figure 5:
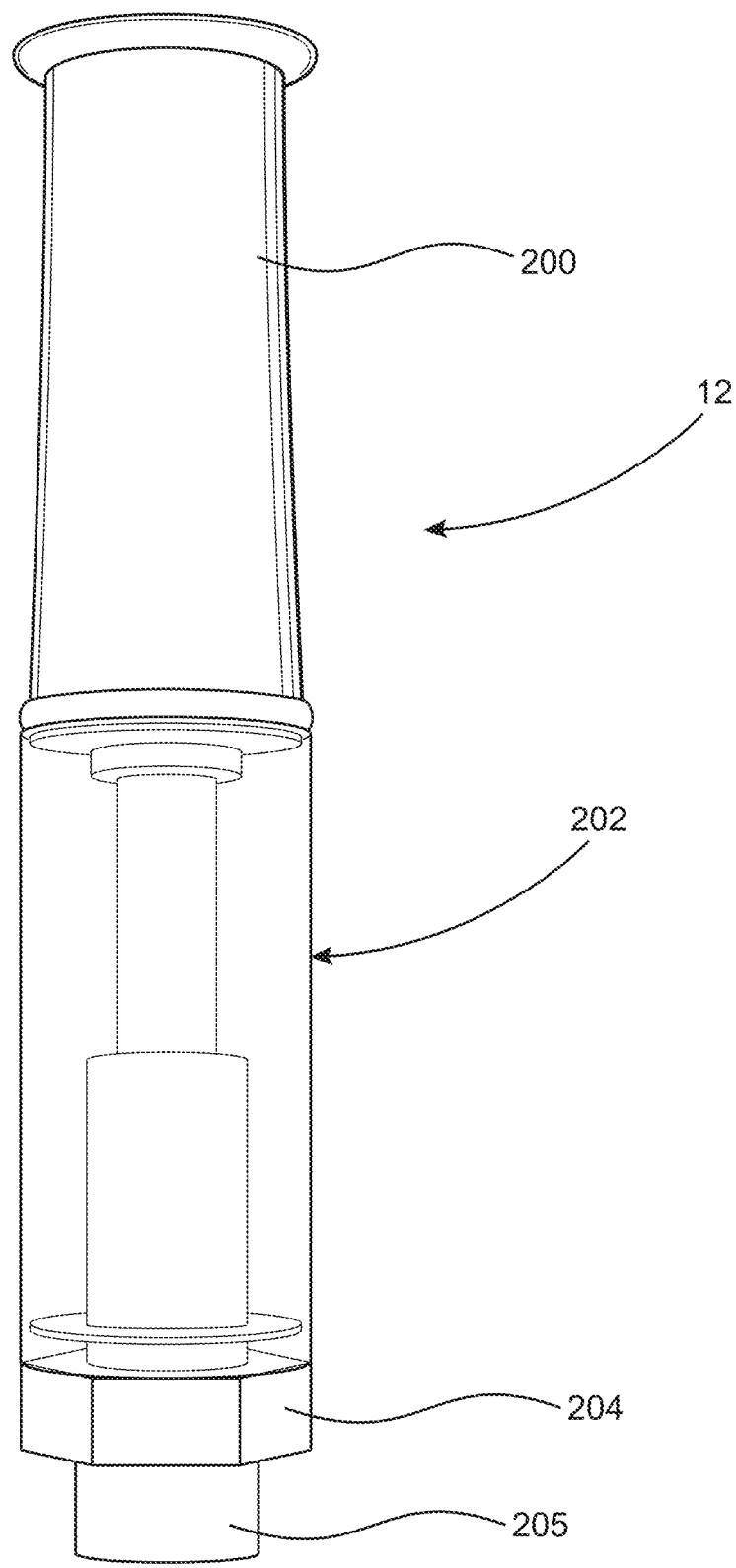
FIG. 5 is a perspective view of one of a possible plurality of vaporizable material cartridges usable with the various embodiments of the vapor generating assembly of the present invention.

By way of example only and with reference to FIG. 5 the vaporizable material cartridge 12 is representative of a number of known or conventional cartridges and may include a mouthpiece 200 and an interior chamber 202. The chamber 202 is for the containment of a vaporizable material which, as set forth herein, may vary in content or ingredients such as differences in flavoring, nicotine content and other agents or ingredients. Also, as conventionally structured the vaporizable material cartridges 12 includes a heating element 204 and the connector 205. As utilized the connector 205 of the cartridge 12 is connected to one of the connectors 18 such that the terminal 20 of the corresponding connector 18 is disposed in electrical interconnection and activating relation to the heating element 204 of the cartridge 12. It is again emphasized that the structural features of the exemplary cartridge 12 is representative only of a number of such vaporizable material cartridges with which the assembly 10 and assembly 100 (to be described hereinafter with reference to FIG. 7-12) may be utilized.

Moreover, each of the plurality of connectors 18 may be "universally" structured to facilitate attachment to different types, brands, categories, etc. of vaporizable material cartridges 12. Further, each of the plurality of connectors 18 may include a female-type, threaded attachment and may also have magnetic capabilities. Such magnetic capabilities further facilitate the connection to different types of vaporizable material cartridges 12.

The plurality of connectors 18 and corresponding ones of the conductive terminals 20 are disposable in current transferring relation to a heating element 205 of the type typically included within a correspondingly disposed one of the plurality of conventional vaporizable material cartridges 12, to which a corresponding connector 18 is attached. Moreover, in a preferred embodiment represented by assembly 10, the power source 16 comprises a plurality of batteries 17 each electrically connected to a different one of the plurality of connectors 18 and to a corresponding one of the terminals 20 associated with each of the plurality of connectors 18.

The housing 14 of assembly 10 comprises a plurality of housing sections 15 each of which is dimensioned and configured to contain a different one of the plurality of batteries 17 which at least partially define the power source 16. In cooperation therewith, each of the plurality of connectors 18 is disposed in segregated relation to one another while being concurrently attached to a different one of the plurality of housing sections 15. Also, in at least one structural modification, each of the plurality of housing sections 15 comprises a tubular or sleeve-like configuration having a hollow interior. The hollow interior of each of the plurality of tubular or sleeve-like housing sections 15 is dimensioned to retain a different one of the plurality of batteries 17 therein in segregated relation to one another. Moreover, each the batteries 17 may be a rechargeable battery.

One feature of this embodiment of the assembly 10 comprises the plurality of housing sections 15 being fixedly connected one another to collectively define a "unitary construction" of the housing 14. The unitary construction of the housing 14 may be further defined by the fixedly attached housing sections 15 and the corresponding plurality of connectors 18 thereby facilitating the handling and utilization of the assembly 10. As represented, the unitary construction of the housing 14 may be concurrently attached to a plurality of the vaporizable material cartridges 12, thereby providing an increase in the volume of vapor output, when in use.

Another feature of this embodiment of the assembly 10 includes the aforementioned control assembly 22 being operatively connected to the power source 16. Further, the control assembly 22 comprises a plurality of switches 23 each operatively mounted on a different one of the housing sections 15 in current regulating relation between correspondingly disposed ones of the plurality of batteries 17 and the connector 18 and corresponding ones of the terminals 20. Moreover, each of the plurality of switches 23 is structured to variably regulate current flow from the plurality of batteries 17 to correspondingly disposed ones of the plurality of terminals 20. Further, each of the plurality of switches 23 of the control assembly 22 is structured for independent activation and control of each of the terminals 20.

Therefore, due at least in part to the enhanced versatility of the control assembly 22, comprising a plurality of switches 23, each of the terminals 20 may be independently activated, which in turn activates a corresponding one of the vaporizable material cartridges 12 attached to the connector 18 associated with a given terminal 20. As should also be apparent, the plurality of switches 23 may be concurrently activated and independently regulated such that all of the plurality of vaporizable material cartridges 12 attached to the individual connectors 18 and corresponding terminals 20 concurrently produce vapor. Such concurrent activation serves to greatly increase the volume of generated vapor accessible by a user.

As is well known, the composition of the available vaporizable material in different cartridges may include different flavoring agents, quantities of nicotine and other ingredients. Therefore, the plurality of variable switches 23 of the control assembly 22 may independently and/or concurrently activate the plurality of connected vaporizable material cartridges 12, in a manner which may selectively vary the content of the vapor being consumed. In addition, the current directed to each of the cartridges 12 may be variably regulated to control the amount of vapor generated by each of the cartridges. Therefore, while the volume of generated vapor may be greatly increased to the satisfaction of a user, such a user can also selectively regulate the different flavors, agents, etc. contained within the generated vapor by selectively varying the amount of current transferred to each cartridge 12, via a corresponding connector 18 and associated terminal 20 to which a given cartridge 12 is attached.

Figure 4:
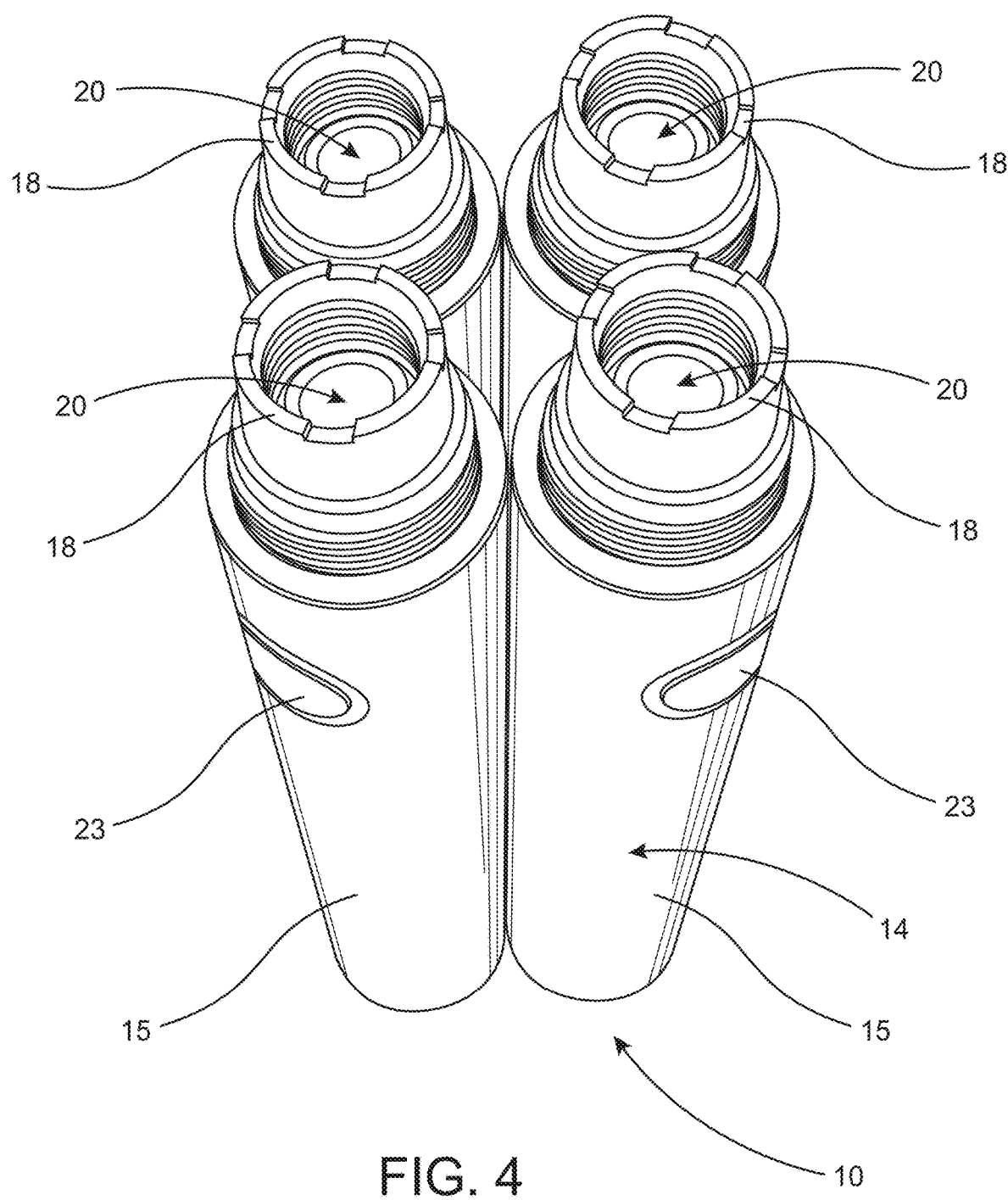
FIG. 4 is a top perspective view of yet another embodiment of the assembly of the present invention.

As emphasized, the assembly 10 is structured to concurrently operate and activate a plurality of vaporizable material cartridges 12 of the type, but not limited to, that shown in FIG. 5. Therefore, the structural modification of the assembly 10 as represented in FIG. 4, as compared to the housing 14 in FIGS. 1-3, clearly indicates that the number of housing sections 15, connectors 18 and terminals 20 may vary, such as including three or four in number. In turn, the number of vaporizable material cartridges 12 that may be concurrently used may also vary. In more specific terms, the housing 14 may include a plurality of housing sections 15 which is preferably, but not necessarily, at least three in number and may be four in number. As such, corresponding number of connectors 18, terminals 20, batteries 17 may be three or four in number to define the aforementioned "unitary construction" of the housing 14. However, it is emphasized that the assembly 10 is not limited to a precise three or four housing sections 15 as represented in FIGS. 1-4, but may vary in number.

Figure 6:
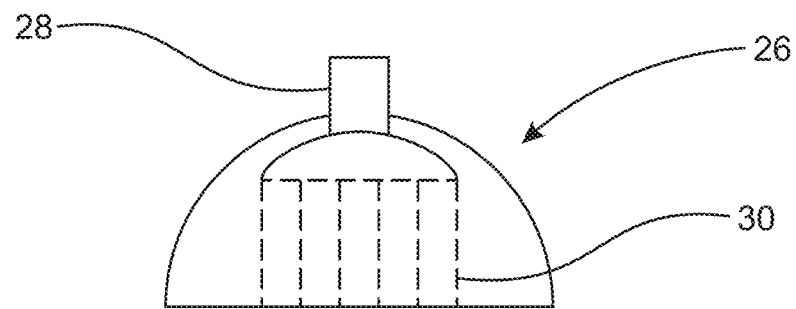
FIG. 6 is a schematic representation of an access or inhalation adaptor of the present invention.

To further facilitate the delivery of vapor generated concurrently by a plurality of vaporizable material cartridges, the assembly 10 of the present invention is also usable with a vapor access or inhalation adaptor, generally and schematically indicated as 26 in FIG. 6. The access or inhalation adaptor 26 may be structurally adapted for use with different preferred embodiments of the present invention including the assembly 10 in FIGS. 1-4 and the assembly 100 as represented in FIGS. 7-12. The access or inhalation adaptor 26 includes an access opening or "mouthpiece" 28. Further, the access or inhalation adaptor 26 may be removably connected to the housing 14 in at least partially enclosing relation to all of the vaporizable material cartridges 12 attached to the plurality of connectors 18 and in direct fluid communication with the quantity of vapor generated thereby. In accomplishing this, the access or inhalation adaptor 26 may include a path of fluid flow generally indicated as 30. The path of fluid flow 30 is disposed and structured to direct vapor concurrently generated by all of the vaporizable material cartridges 12 to the access opening or mouthpiece 28 of the access or inhalation adaptor 26.

Yet another preferred embodiment of the present invention is directed to the assembly 100 which also facilitates the generation of vapor when used in combination with preferably a plurality of vaporizable material cartridges 12, of the type but not limited to that represented in FIG. 5, as set forth above. As such, the assembly 100 has similar operational advantages, which may be attractive to the user or consumer, at least to the extent of enhancing the volume of generated vapor and the ability to concurrently consume vapor generated by a plurality of vaporizable material cartridges 12.

Figure 9:
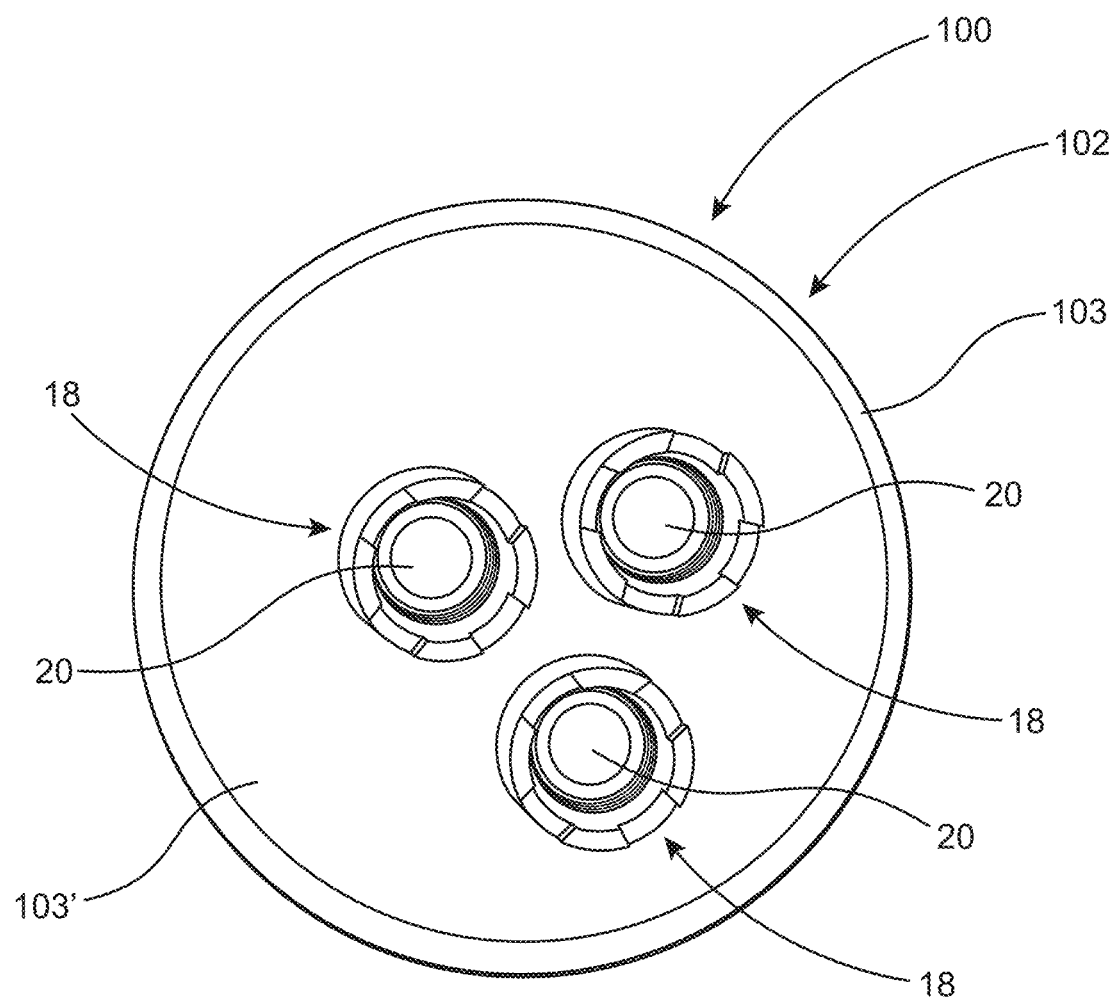
FIG. 9 is a top perspective view of the embodiment of FIG. 8.
Figure 10:
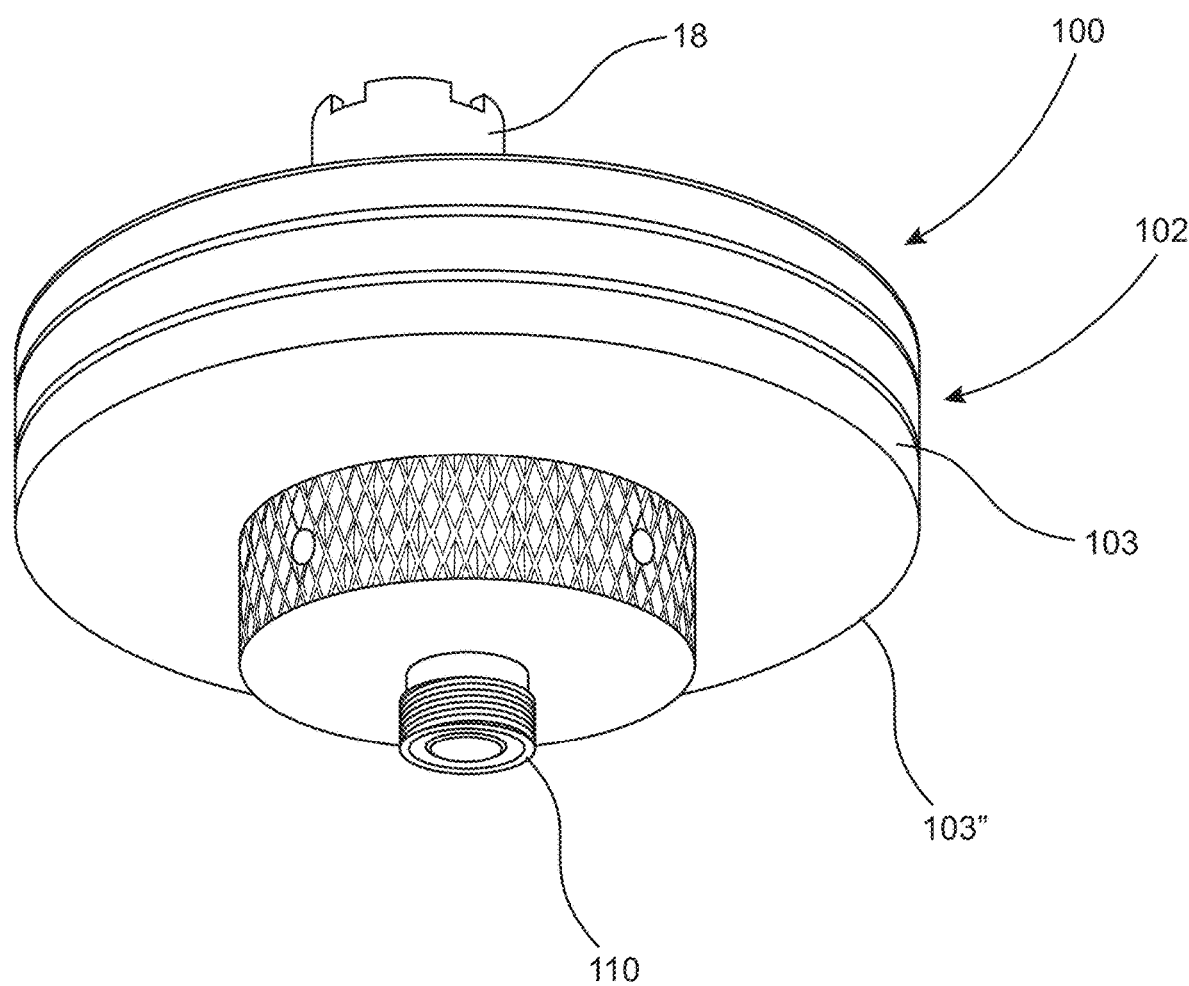
FIG. 10 is a bottom perspective view of the embodiment of FIGS. 8-9.
Figure 11:
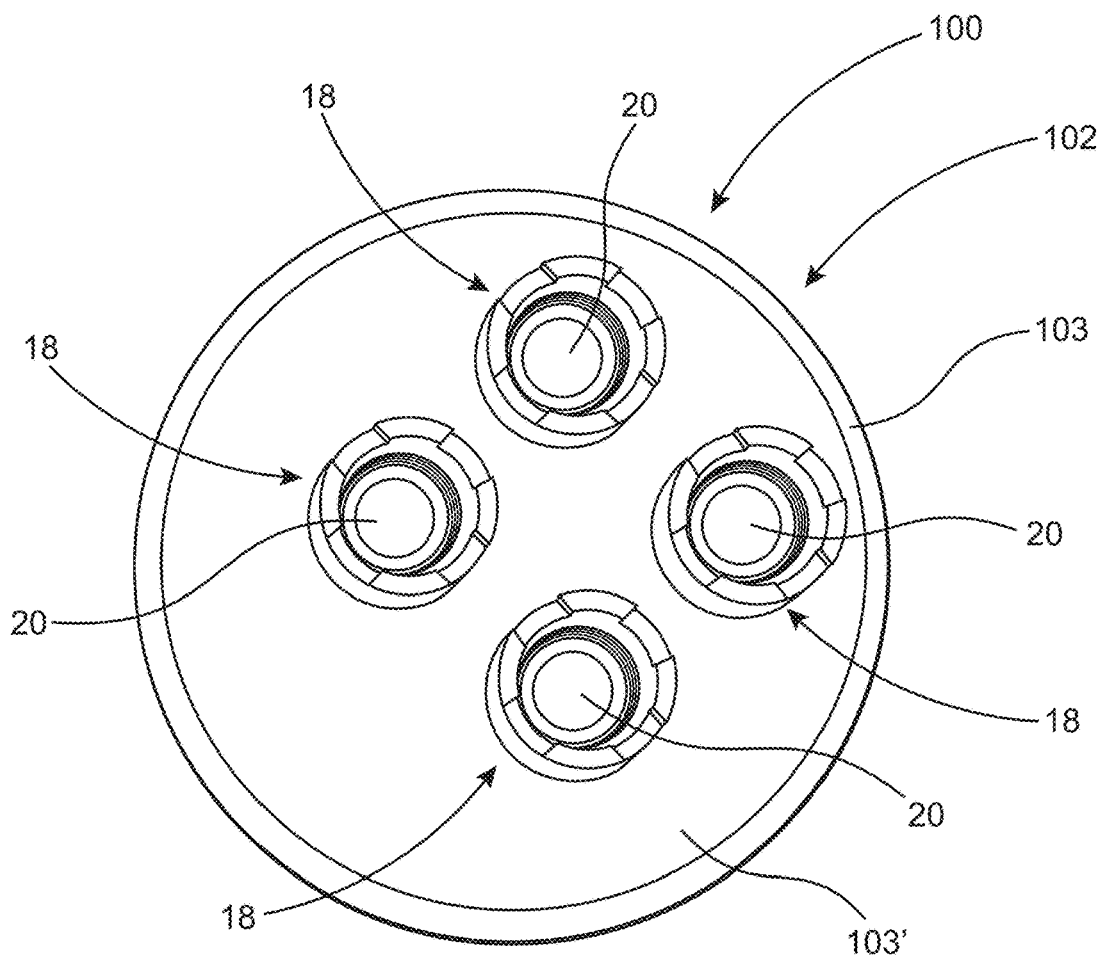
FIG. 11 is a top perspective view of yet another embodiment of a power adapter of the present invention.
Figure 12:
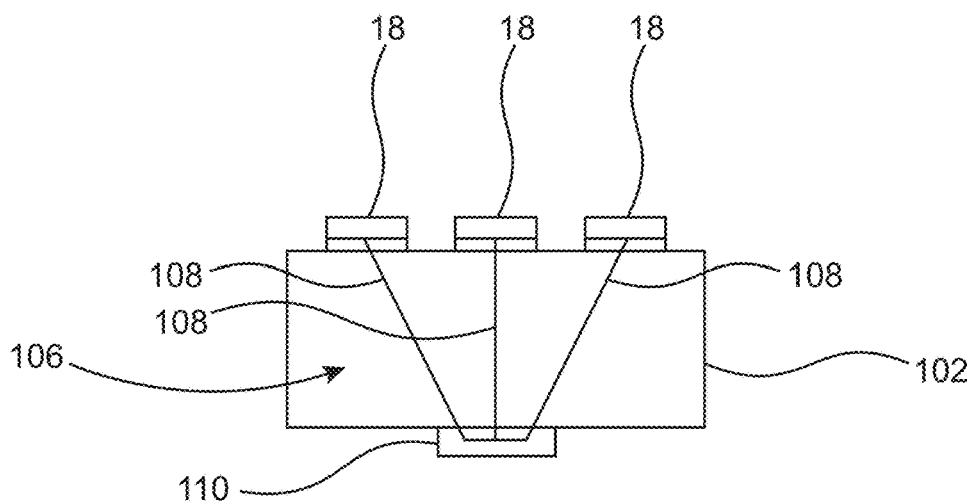
FIG. 12 is a schematic representation of a current distributor operatively associated with the different embodiments of the power adapter, as represented in FIGS. 8-11.

More specifically, as represented in FIGS. 1 and 12, the embodiment of the assembly 100 includes a "power adapter" 102 electrically connected to a power source 104. The power source 104 may be a part of the assembly 100 as provided to the consuming public. In the alternative, the power adapter 102 may be utilized with different power sources and be made available to the consuming public independently of the power source 104. Therefore, the power adapter 102 includes a plurality of connectors 18 each of which is structured for operative attachment to a different one of a plurality of vaporizable material cartridges 12, as set forth above with regard to the assembly 10. A comparison of FIGS. 9 and 11 indicates that the number of connectors 18 may vary, such as three connectors 18, as represented in FIG. 9 and four connectors 18, as represented in FIG. 11. However, the plurality of connectors 18 and corresponding terminals 20 are not limited to either three or four in number.

In addition, the power adapter 102 includes a current distributor 106, schematically represented in FIG. 12, comprising a plurality of conductors 108. Each of the plurality of conductors 108 is electrically interconnected between the power source 104 and a different one of the plurality of connectors 18. In order to facilitate such electrical connection, the power adapter 102 also includes a conductive attachment 110 structured to be removably connected to a corresponding output terminal 104' on the power source 104. As such, the plurality of conductors 108 are disposed and structured to independently direct current flow from the conductive attachment 110, when it is connected to the power source 104 via output terminal 104', and each of the plurality of connectors 18, corresponding terminals 20 and attached ones of the vaporizable material cartridges 12.

As with the assembly 10 described above, the assembly 100 includes each of the connectors 18 having a conductive terminal 20. Moreover, each terminal 20 is electrically connected in current transferring relation to a heating element 205 within an attached one of the plurality of vaporizable material cartridges 12. The plurality of terminals 20 and corresponding ones of the plurality of connectors 18 are cooperatively structured to assure electrical interconnection between each terminal 20 and the heating element 205 associated with the vaporizable material cartridge 12 attached to a corresponding one of the connectors 18, as also set forth above.

In even more specific terms, the power adapter 102 comprises a base 103, wherein the plurality of connectors 18 are fixedly mounted on an exposed, outer face or end 103' of the base 103 so as to extend outwardly there from in laterally spaced relation to one another, as represented in at least FIG. 9. The lateral spacing of the plurality of connectors 18 is such as to facilitate the concurrent attachment of a plurality of the vaporizable material cartridges 12 thereto, thereby enabling their concurrent use. In cooperation therewith, the aforementioned conductive attachment 110 is fixedly mounted on and extends outwardly from an inner and/or opposite face 103" of the base 103, relative to the outer face or end 103' and plurality of connectors 18. As such the conductive attachment 110 is structured to be removably connected to output terminal 104' and thereby establish an electrical interconnection between the power source 104 and the plurality of connectors 18 and corresponding terminals 20.

Further, one additional feature of this embodiment of the assembly 100 includes the power source 104 comprising a single battery of sufficient capacity to concurrently and/or individually power each of the plurality of vaporizable material cartridges 12 connected to different ones of the plurality of connectors 18 and terminals 20. Adaptive switching, as at 112, may be operatively associated with the battery and power source 104, such as being mounted on a casing or housing disposed in retaining relation to a single battery power source 104. The output terminal 104' of the battery/power source 104 is directly but removably electrically interconnected to the conductive attachment 110 associated with the base 103 of the power adapter 102 of the assembly 100.

Therefore, the removable attachment of the power adapter 102, via the conductive attachment 110, establishes an operative electrical interconnection between the battery/power source 104, the conductors 108 of the current distributor 106 and the terminals 20 associated with each of the plurality of connectors 18. In turn, the heating elements of each of the plurality of vaporizable material cartridges 12, connected to different ones of the plurality of connectors 18 and corresponding terminals 20, are capable of being individually and collectively activated. The resultant activation, through appropriate adaptive and a variable switching 112, will serve to selectively activate the plurality of vaporizable material cartridges 12 attached to the plurality of connectors 18 and corresponding terminals 20, resulting in a concurrent generation of vapor from the plurality of cartridges 12.

While not specifically represented, the adaptive switching 112 may be structured to selectively and independently vary current flow from the battery/power source 104 to each of the connectors 18 and corresponding terminals 20, via conductors 108. Such adaptive and variable switching 112 may include different variably adjustable circuitry of conventional or customized design.

As with the embodiment of the assembly 10, the assembly 100 may also be utilized with an access or inhalation adaptor 26, of the type described above, with primary reference to FIG. 6. More specifically, the access or inhalation adapter 26 may be removably connected to the base 103 of the power adapter 102 in at least partially enclosing relation to all of the vaporizable material cartridges 12 attached to connectors 18 and in direct fluid communication with the quantity of vapor generated thereby. In accomplishing this, the access or inhalation adaptor 26 may include the path of fluid flow 30 disposed and structured to direct all of the vapor concurrently generated by all of the vaporizable material cartridges 12 to a mouthpiece 28 of the access or inhalation adaptor 26.

As represented in FIGS. 13-20, another preferred embodiment of the present invention is directed to an access or inhalation assembly 110 which facilitates the generation of vapor when used in combination with a plurality of operatively positioned and interconnected vaporizable material cartridges 12'. As such, this embodiment has similar operational advantages, which may be attractive to the user or consumer, at least to the extent of enhancing the volume of generated vapor and the ability to concurrently consume vapor generated by a plurality of the vaporizable material cartridges 12'.

The access or inhalation adapter 110 includes a housing 112 having a base segment 114 and an access segment 116. The base segment 114 is structured to concurrently receive the plurality of cartridges 12', each containing a vaporizable material, in an operative, vapor generating position on the interior thereof. In cooperation therewith, the access segment 116 is connected to the base segment 114 in fluid communication to the outlets 212" of the plurality of cartridges 12'. In addition, the access segment 116 may include or at least partially define a mouthpiece 117 dimensioned and configured to direct vapor concurrently, from the plurality of cartridges 12' within the base segment 114 to the user's mouth (not shown), thereby facilitating inhalation or consumption by the user. The generated vapor passes through the mouthpiece 117 via a vapor outlet 117' as represented in at least FIGS. 13-15.

Figure 19:
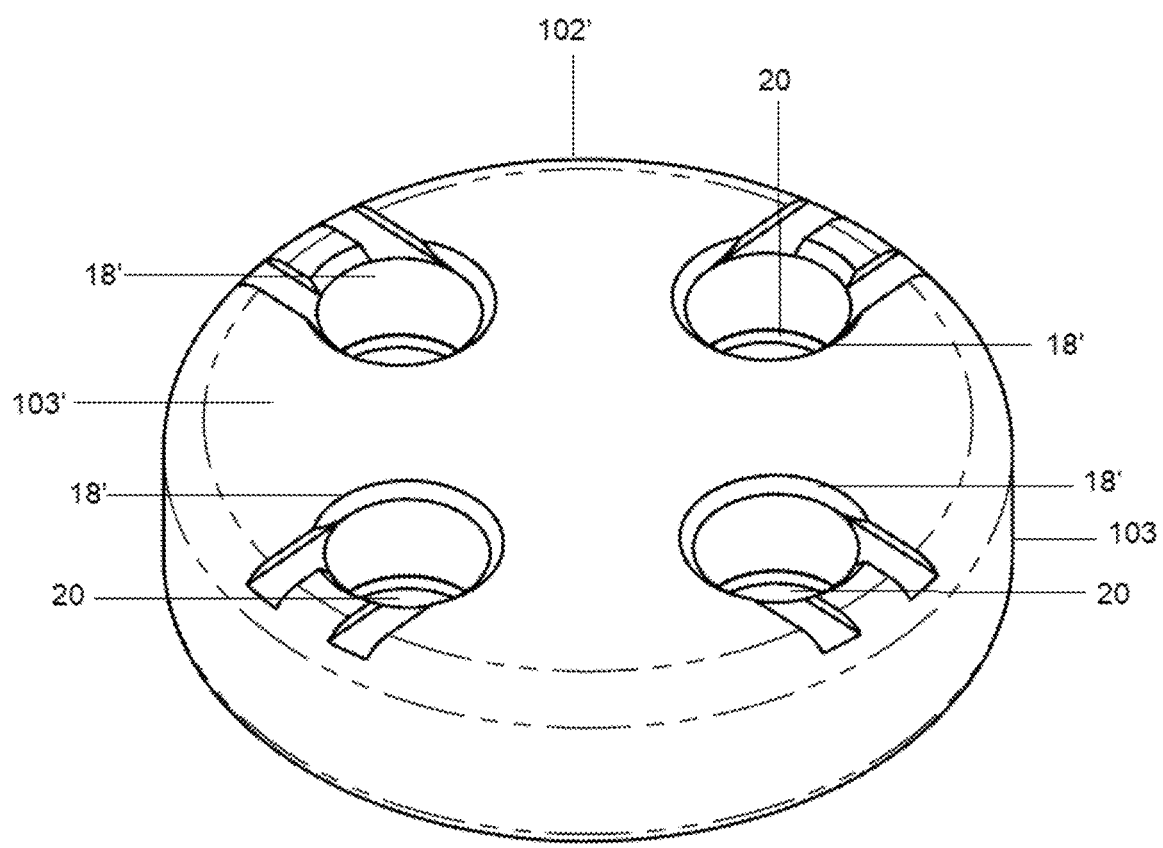
FIG. 19 is a bottom perspective view of the power adapter operationally similar but structurally distinguishable from the embodiment of FIGS. 8-11.
Figure 20:
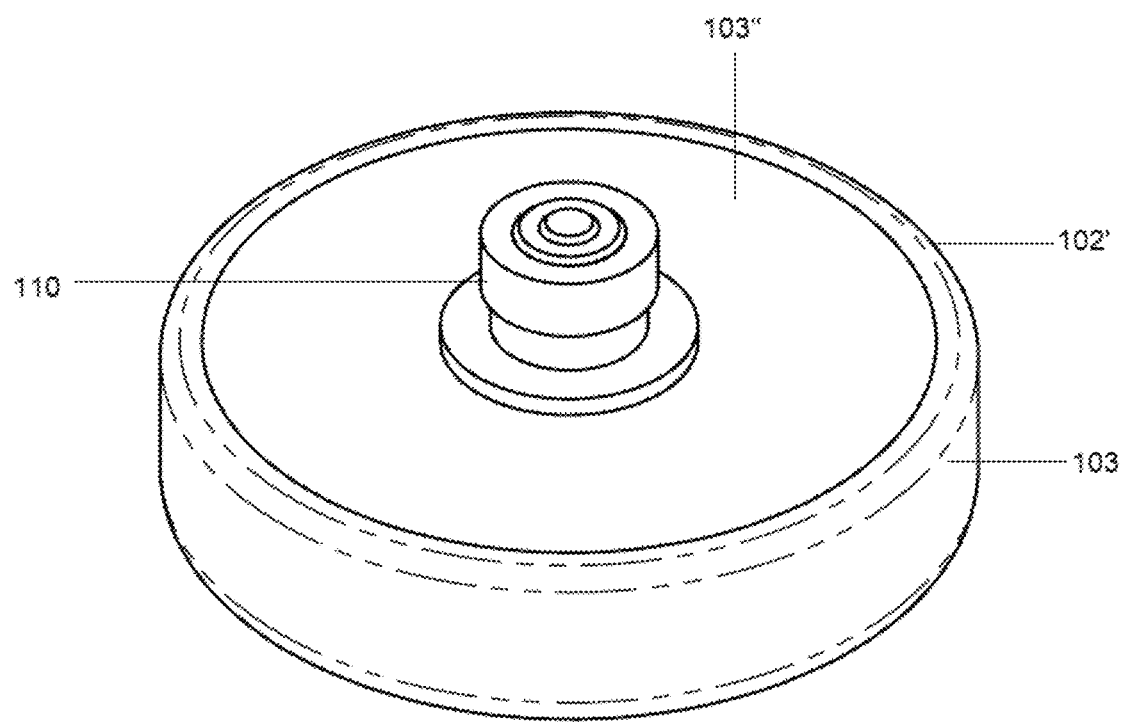
FIG. 20 is a top perspective view of the power adapter of the embodiment FIG. 19.

As indicated, the embodiment of FIGS. 13-20 is operationally similar to the embodiments of FIGS. 1-12 when the cartridges 12' are electrically interconnected to a power source 104 (see FIG. 7) via a power adapter 102' as described above and as represented in detail in the embodiments of FIGS. 19 and 20. Such a power source 104 may be a part of the assembly as provided to the consuming public. In the alternative, the power adapter 102' may be utilized with different power sources and be made available to the consuming public independently of the power source.

Figure 7:
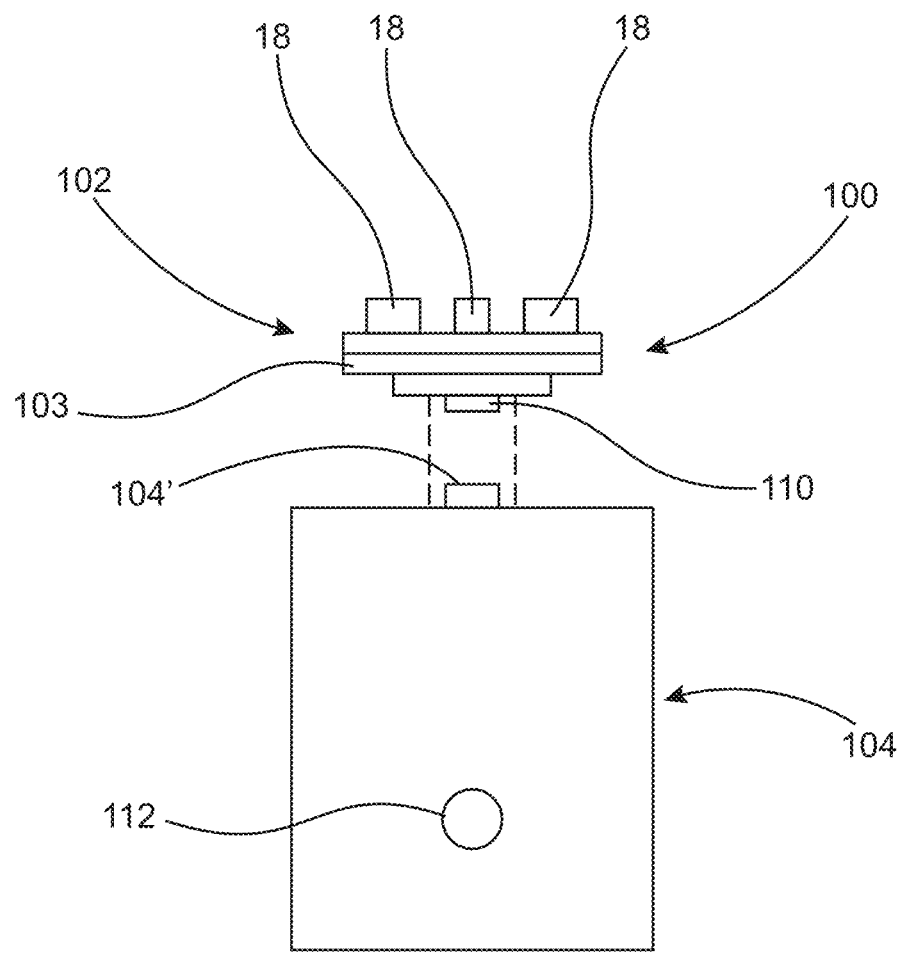
FIG. 7 is a schematic representation of yet another preferred embodiment of the vapor generating assembly of the present invention.
Figure 8:
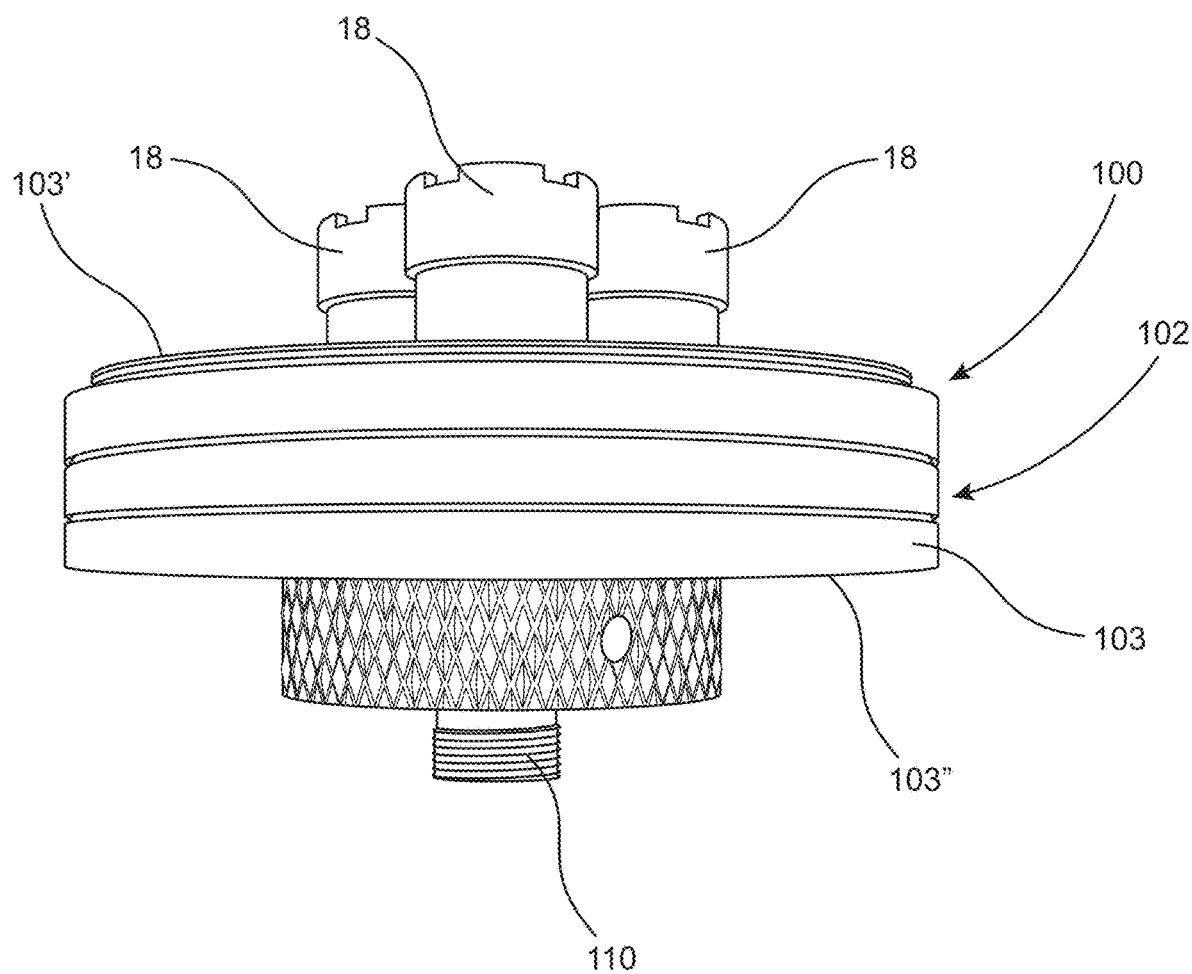
FIG. 8 is a perspective view of a power adapter of the embodiment of FIG. 7.

With reference to FIGS. 19 and 20, the power adapter 102', may be electrically connected to a power source of the type schematically represented as 104 in FIG. 7, or a different type power source as generally set forth above. The power adapter 102' includes a base 103 and a plurality of connectors 18' each of which is structured for operative attachment to a different one of a plurality of cartridges 12', as represented in at least FIGS. 13-15. As also represented, the plurality of connectors 18' differ somewhat from the connectors 18 represented in FIGS. 7-12 in that the connectors 18' may be somewhat recessed so as to accommodate a removable attachment to individual ones of the plurality of cartridges 12', as represented in FIG. 13-17. As also set forth above, the number of connectors 18 may vary. Similarly, the plurality of connectors 18' are not limited to either three or four in number, as presented throughout the Figures herein.

In addition, the power adapter 102' may include a current distributor 106, of the type schematically represented in FIG. 12 wherein a conductive attachment terminal 110 is structured to be removably connected to a corresponding output terminal 104' on the power source 104. As such, independent current flow is directed from the conductive attachment terminal 110, when it is connected to the power source 104 via output terminal 104' and each of the plurality of connectors 18', corresponding terminals 20 and attached ones of the vaporizable material cartridges 12'.

As indicated, each of the connectors 18' includes a conductive terminal 20 electrically connected in current transferring relation to a heating element 119 which is attached to or part of the plurality of cartridges 12', as also represented in FIGS. 13-15. The plurality of terminals 20 and corresponding ones of the plurality of connectors 18' are cooperatively structured to assure electrical interconnection between each terminal 20 and the heating element 119 associated with each of the cartridges 12' attached to a corresponding one of the connectors 18'. As also represented, the number of connectors 18' are preferably equivalent to the number of cartridges 12'. However, a number of cartridges 12' attached to the power adapter 102' may be less than the number of connectors 18', in situations where a user may wish to consume a lesser volume of generated vapor.

Also, the power adapter 102' comprises a base 103, wherein the plurality of connectors 18' are fixedly mounted on an exposed, outer face or end 103' of the base 103 so as to extend outwardly there from in laterally spaced relation to one another. The lateral spacing of the plurality of connectors 18' is such as to facilitate the concurrent attachment of a plurality of the cartridges 12' thereto, thereby enabling their concurrent use. In cooperation therewith, the aforementioned conductive terminal attachment 110 is fixedly mounted on and extends outwardly from an inner and/or opposite face 103" of the base 103, relative to the outer face or end 103' and plurality of connectors 18'. As such, the conductive attachment terminal 110 is structured to be removably connected to output terminal 104' and thereby establish an electrical interconnection between the power source 104 and the plurality of connectors 18' and corresponding terminals 20.

In order to facilitate utilization of the inhalation adapter 110, the base segment 114 and the access segment 116 of the housing 112 may be removably connected to one another in order to aid in the insertion and/or removal of the plurality of cartridges 12', after and before use. The inhalation or access adapter 110 is structurally and operatively intended to be used with the aforementioned power adapter 102' and an appropriate power source such as, but not limited to, that represented in FIG. 7 as 104. When these components are operatively attached, utilization of the intended operative features of generating and inhaling vapor concurrently from a plurality of vaporizable material cartridges may be accomplished.

The housing 112 and more particularly the base segment 114 comprises a plurality of interior chambers 120 each dimensioned to receive and maintain a different one of the plurality of cartridges 12' therein in an operative, vapor generating position. Such an operative, vapor generating position of the cartridges 12' is accomplished and/or at least partially defined, when the cartridges 12' are operatively attached to the power adapter 102' and an appropriate power source. Moreover, the plurality of chambers 120 are disposed in laterally spaced, at least partially segregated relation to one another as they extend, in substantially parallel relation to one another along at least a majority and/or an entirety of the length of the base segment 114 and/or housing 112, as clearly represented in at least FIGS. 13-15. Further, each of the plurality of chambers 120 includes opposite open ends 120' and 120". One open 120' disposed adjacent the access segment 116 is disposed in fluid communication with the mouthpiece when 117, including at least one vapor outlet when 117'. The opposite open 120" and the correspondingly disposed conductive inlet terminal and/or heater element 119 of each of the plurality of cartridges 12' is disposed, dimensioned and configured to engage the aligned ones of the plurality of connectors 18' and terminals 20 of the power adapter 102', in a manner which facilitates electrical powering of the heat element 119 associated with each of the plurality of cartridges 12'. Accordingly, the aforementioned operative, vapor generating position of each of the plurality of cartridges 12' is at least partially defined when the access or inhalation adapter 110 is operatively connected to an appropriate power source via the power adapter 102'.

Therefore, the inhalation adapter 110, as represented in FIGS. 13-20, having a plurality of chambers 120 for receiving the plurality of cartridges 12' on the interior thereof may be assembled by attachment of the base segment 114 of the housing 112 to the power adapter 102'. Concurrent to the power adapter 102' being connected to the appropriate and compatible power source, such that the power source is electrically interconnected to each of the plurality of cartridges 12' within the plurality of chambers 120 of the base segment 114 of the housing 112 via the power adapter 102'.

In order to further facilitate operative assembly and disassembly including the insertion and removal of the plurality of cartridges 12', the base segment 114 may be removably connected to the power adapter 102' in a manner which assures the electrical interconnection of the plurality of cartridges 12' to the power source, as set forth above. As such, the base segment 114 includes a flexible construction such as flexible end portion 114'. As represented in FIGS. 16-18, at least one embodiment of the flexible portion 114' comprises the periphery of the "lower end" may have a segmented construction wherein a plurality of spaces 115 are formed in the lower periphery. Also, due to the fact that the base segment 114, or at least the lower peripheral end thereof, is formed of a plastic or other possibly deformable or flexible material, the segments 115' of the lower peripheral end may expand or flex outwardly as they are forced over the outer periphery of the power adapter 102'.

Due to these flexible characteristics, the flexible end portion 114' it is at least minimally expandable outwardly from the center of the base segment 114 and when so expanded the end portion 114' is disposed in removable gripping attachment with the power adapter 102'. In such a removable gripping attachment, the flexible end portion 114' may be disposed in substantially surrounding relation to the outer periphery of the power adapter 102', as represented in FIGS. 13-15. Moreover, the structural features of the flexible end portion 114' may be such as to define somewhat of a "snap-fit" attachment which allows the connection and removal of the base segment 114 relative to the power adapter 102' by a pushing and pulling force respectively exerted on the base segment 114 and/or the power adapter 102'.

Also, the versatility of the structural and operative features of inhalation adapter 110 allows disposition in an assembled form or state, as represented in FIGS. 13-15 by attaching the plurality of cartridges 12' to the power adapter 102' and subsequently attaching the power adapter 102' to the power source. In the alternative, the power adapter 102' may first be operatively secured to the power source (as at 104 in FIG. 7) and the plurality of cartridges 12' subsequently connected to the power adapter 102'. In each of these assembly procedures, the plurality of cartridges 12', once attached to the power adapter 102' are inserted into individual ones of the plurality of chambers 120 within the base segment 114 of the housing 110. Moreover, if the access segment 116 is removably connected to the base segment 114, it may be secured to the base segment 14 before or after insertion of the plurality of cartridges 12' into the plurality of channels 120. When in an operable, assembled mode or state, the open ends 120' of the plurality of channels 120 are in fluid communication (vapor transmitting relation) with the interior 116' access segment 116 and the at least one vapor outlet 117' of the preferably integrated mouthpiece 117. Obviously, if the access segment 116 and base segment 114 are fixedly attached or integrated, the access segment 116 will be disposed in the fully assembled orientation of FIGS. 13-15, concurrently with the base segment 114 being attached to the power adapter 102', etc.

In operation and when the inhalation assembly 110, the power adapter 102' and a power source, as at 104, are all assembled and operatively attached, activation of the power source/battery via an appropriate switch 23 (see FIG. 7) or other appropriate actuating structure, will cause a generation of vapor from each of the plurality of cartridges 12' operatively disposed in different ones of the plurality of channels 120. Such generated vapor will pass through the open and 120', through the interior 116' of the access segment 116 and outwardly from the at least one vapor outlet or opening 117' of the mouthpiece 117.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly for inhaling generated vapor concurrently from a plurality of cartridges containing vaporizable material, said assembly comprising:
   a power source,
   a power adapter connected to said power source and structured to electrically interconnect the plurality of cartridges to said power source,
   an inhalation adapter including a housing disposed in at least partially enclosing relation to the plurality of cartridges,
   said housing connected to said power adapter and including an access segment;
   said access segment disposed in fluid communicating relation with outlets of the plurality of cartridges, and
   said access segment comprising a vapor outlet disposed and configured to direct vapor from the interior of said access segment to a user's mouth.

2. The assembly as recited in claim 1 wherein said housing comprises a base segment including a plurality of chambers each dimensioned to receive and retain a different one of the plurality of cartridges in an operative position therein.

3. The assembly as recited in claim 2 wherein said operative position comprises said electrical interconnection of said power adapter and said fluid communication of said access segment relative to the plurality of cartridges.

4. The assembly as recited in claim 2 wherein said plurality of chambers extend along at least a majority of a length of said base segment.

5. The assembly as recited in claim 2 wherein said plurality of chambers are disposed in laterally spaced, at least partially segregated relation to one another within said base segment.

6. The assembly as recited in claim 2 wherein each of said plurality of chambers includes at least one open outer and operatively disposed adjacent said access segment in communicating relation with said vapor outlet.

7. The assembly as recited in claim 2 wherein said power adapter comprises a plurality of connectors each disposable in electrical interconnecting relation between said power source and a different one of said plurality of cartridges.

8. The assembly as recited in claim 7 wherein each of said plurality of chambers are disposed and aligned, communicating relation with a different one of said plurality of connectors, concurrent to said base segment connected to said power adapter.

9. The assembly as recited in claim 8 wherein said base segment is removably connected to said power adapter.

10. The assembly as recited in claim 9 wherein said access segment is removably connected to said base segment.

11. The assembly as recited in claim 10 wherein said vapor outlet is fixedly connected to said access segment and is cooperatively structured their width to define a mouthpiece.

12. The assembly as recited in claim 2 wherein said base segment includes a flexible end portion disposable in a removable outwardly expanded gripping attachment with said access segment.

13. An assembly for inhaling generated vapor concurrently from a plurality of cartridges containing vaporizable material, said assembly comprising:

an inhalation adapter comprising a housing including a base segment and an access segment, said base segment structured to concurrently receive and maintain the plurality of cartridges in an operative, vapor generating position;

said access segment connected to said base segment in fluid communicating relation to outlets of the plurality of cartridges, a mouthpiece connected to said access segment and disposed and structured to concurrently direct generated vapor from the outlets of the plurality of cartridges to a user's mouth, via said access segment.

14. The assembly as recited in claim 13 wherein said base segment and said access segment are removably connected to one another.

15. The assembly as recited in claim 13 wherein said base segment comprises a plurality of interior chambers each dimensioned to receive and maintain a different one of said plurality of cartridges therein, in said operative, vapor generating position.

16. The assembly as recited in claim 15 wherein said plurality of chambers are disposed in laterally spaced, at least partially segregated relation to one another within said base segment.

17. The assembly as recited in claim 15 wherein each of said plurality of chambers includes at least one open outer end operatively disposed adjacent said access segment, in communicating relation with said vapor outlet.

18. The assembly as recited in claim 15 wherein said power adapter comprises a plurality of connectors each disposable in electrical interconnecting relation between said power source and a different one of said plurality of cartridges.

19. The assembly as recited in claim 13 wherein said operative, vapor generating position comprises the plurality of cartridges electrically interconnected to a power source.

20. The assembly as recited in claim 19 wherein said base segment comprises a flexible portion disposable in a removable, expanded gripping engagement relative to the power source.

* * * * *